Aug. 9, 1955 W. M. BOAM ET AL 2,714,760
METHOD OF BRAZING AND JOINT PRODUCED THEREBY
Filed July 2, 1951
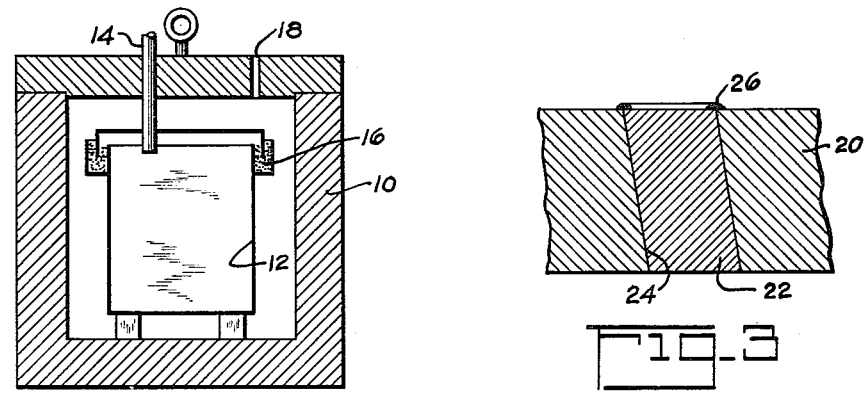
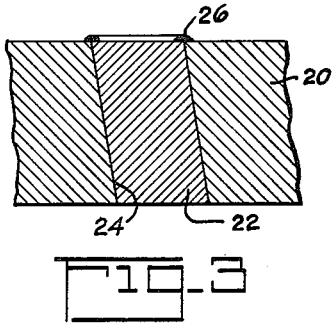
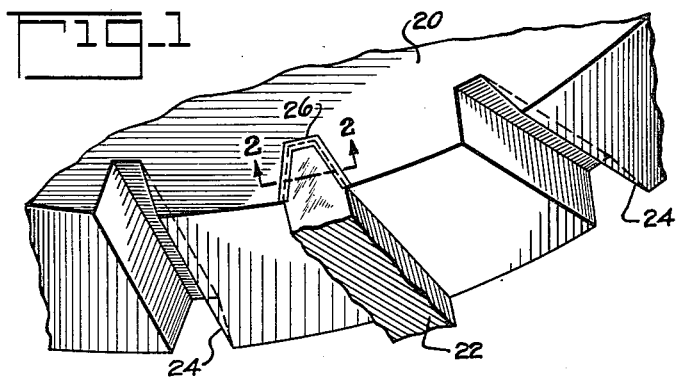
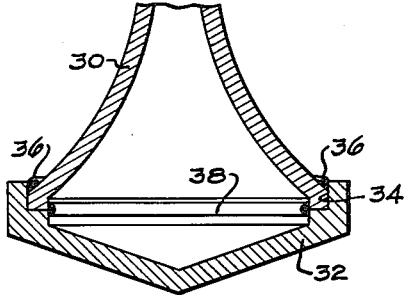
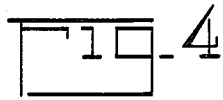
INVENTORS
WILLARD M. BOAM.
HERMAN H. HANINK.
BY Victor D. Behm
ATTORNEY

United States Patent Office 2,714,760
Patented Aug. 9, 1955

2,714,760

METHOD OF BRAZING AND JOINT PRODUCED THEREBY

Willard M. Boam, Fair Lawn, and Herman H. Hanink, Ridgewood, N. J., assignors to Curtiss-Wright Corporation, a corporation of Delaware Application July 2, 1951, Serial No. 234,894

14 Claims. (Cl. 29—196)

This invention relates to brazing and is particularly directed to a method of brazing together parts of corrosion resistant high temperature alloys to provide a brazed joint between said parts having physical properties substantially equal to those of the base metal at elevated temperatures. As herein used, by a "corrosion resistant high temperature alloy" is meant an alloy having substantial corrosion and oxidation resistance and useful strength at temperatures over 1000° F.

The use of brazing to join metallic parts has generally been restricted to parts requiring useful strength and oxidation resistance at temperatures under about 1000° F. An object of the present invention comprises the provision of a novel method of brazing alloy parts having useful strength and oxidation resistance at temperatures up to at least 2000° F. such that the resulting brazed joint has physical properties substantially equal to those of said parts at high temperatures up to said high temperature of 2000° F. The provision of such an improved brazed joint constitutes a further object of the invention. A still further object of the invention resides in the use of a new brazing alloy for producing said improved brazed joint.

Other objects of the invention will become apparent upon reading the annexed detailed description in connection with the drawing in which:

Fig. 1 is a schematic view of a brazing furnace used in carrying out the brazing method of the invention;

Fig. 2 is a partial perspective view illustrating a step in the brazing together of two parts in accordance with the invention;

Fig. 3 is a sectional view taken along line 3—3 of Fig. 1; and

Fig. 4 is a sectional view illustrating the corresponding step in the brazing together of two parts having a different configuration from those of Figs. 2 and 3.

If a brazed joint is to have useful strength and oxidation resistance up to temperatures as high as 2000° F. it would normally be expected that the melting temperature of the brazing alloy would be considerably higher thereby requiring even higher furnace brazing temperatures. It has been found that corrosion resistant high temperature alloy parts can be brazed with certain nickel-chromium-boron (Ni-Cr-B) alloys by the method hereinafter described to produce a brazed joint having useful strength and oxidation resistance in excess of the liquidus temperature of the brazing alloy. For example Ni-Cr-B alloys having the following percentage range of its constituents have solidus (melting) and liquidus (freezing) temperatures of about 1850° F. and 1950° F. respectively:

Nickel (Ni)_____65–75%
Chromium (Cr)_____13–20%
Boron (B)_____2.75–4.75%
Iron (Fe)_____3.0–5.0%
Carbon (C)_____0.05–0.5% ⎫ maximum 10%
Silicon (Si)_____3.5–5.5% ⎭

A brazed joint of corrosion resistant high temperature alloy parts made by brazing with such a Ni-Cr-B alloy in accordance with the method hereinafter set forth has been found to have useful strength and oxidation resistance up to temperatures as high as 2000° F. nothwithstanding the lower solidus and liquidus temperatures of said alloy. Accordingly the brazing operation can be carried out at furnace temperatures lower than would otherwise be expected and within a commercially available temperature range of under about 2400° F.

Said Ni-Cr-B alloys contain sufficient chromium to provide adequate heat and oxidation resistance at high temperatures. The boron in the alloy lowers its melting point and for this purpose the amount of boron in the alloy should be equal to at least one-fifth the amount of chromium present.

The presence of iron, carbon and/or silicon in said Ni-Cr-B alloys is not essential. Thus the iron in said Ni-Cr-B alloys functions primarily to increase its corrosion resistance to leaded fuels while the silicon in said alloy functions to lower the melting point slightly. The carbon in said alloys is primarily an impurity although it also probably functions to lower the alloy melting point. A typical Ni-Cr-B alloy used contained 0.45% carbon, 4.0% iron and 4.5% silicon. In addition to the iron, carbon and silicon being unessential, the quantity of nickel, chromium and boron in the alloy may be varied beyond their above specified individual percent ranges. Thus Ni-Cr-B alloys within the following wider range of percentages may be used:

|   | Per cent |
|---|---|
| Ni | 65–85 |
| Cr | 8–20 |
| B | 2–5 |

Within this latter range of its constituents the liquidus temperature of a Ni-Cr-B alloy will vary from about 1950° F. to about 2100° F. Obviously a higher brazing alloy liquidus temperature necessitates a higher furnace brazing temperature so that alloys having lower liquidus temperatures are preferred. A joint of corrosion resistant high temperature alloy parts made in accordance with the invention by brazing with any Ni-Cr-B alloy within this wider range will have useful strength and oxidation resistance at temperatures substantially higher than the melting or liquidus temperature of said brazing alloy and in each case if the base metal has useful strength and oxidation and corrosion resistance at temperatures up to at least 2000° F. said brazed joint will also have useful strength and oxidation and corrosion resistance at temperatures up to at least 2000° F.

Said Ni-Cr-B alloys cannot be preformed like a soft wire for placement about the joint to be brazed. They are commercially available only in a powdered condition and in the as cast condition. In accordance with the invention, the alloy is used in its powdered condition, said alloy being mixed with a binder such as an acrylic resin to form a paste. This mixture, in a paste or dried condition, is then placed about the joint to be brazed. Other materials, such as Lucite and polyethylene can be used as the binder, it being essential that the binder burn away leaving substantially no ash to contaminate the brazed joint.

The mixture of powdered Ni-Cr-B alloy and its binder is placed about the joint to be brazed in a manner similar to a conventional brazing alloy in the form of a soft wire. Brazing with a Ni-Cr-B alloy in accordance with the invention is carried out in a manner similar to furnace grazing with copper as the brazing material except for certain conditons herinafter specified.

The boron in each of said Ni-Cr-B alloys renders it hard and brittle. If, however, the clearance between the adjacent joint surfaces of corrosion resistant high temperature alloy parts to be brazed is sufficiently small relative to the time in which the molten brazing alloy is in ontact with said surfaces then the major portion of the boron in the brazing alloy diffuses into said parts. In addition some of the base metal diffuses into the brazing alloy. This diffusion of boron and base metal renders the residue of the brazing alloy suitably soft and ductile and is desirable for good joint properties. In addition and particularly in the case of high temperature base alloys which contain chromium to provide the corrosion and oxidation resistance and contain a substantial amount of nickel, the boron which diffuses into the base alloy provides said base metal with added strength, particularly increased time-to-rupture strength, at temperatures over about 1000° F. That is, the boron diffusion into the base metal reduces the high temperature creep of the base metal adjacent the joint. This diffusion of boron into each base metal part is limited to a diffusion zone in each part of under about 0.01 inch. Accordingly the invention is particularly useful for brazing oxidation and corrosion resistant high temperature Ni-Cr alloys.

It has also been found that if the joint clearance of the base metal parts to be brazed together is above about 0.005 inch then the quantity of boron in the brazing alloy filling said joint clearance will be substantially in excess of that which can be absorbed by diffusion into the base metal parts during the time the brazing alloy is molten. If such is the case, sufficient boron will be left in the residue of the brazing alloy to render it excessively hard and brittle for best joint properties. If, however, the joint clearance is kept below 0.005 inch then sufficient boron is diffused from the brazing alloy into the base metal which, together with the diffusion of base metal into the brazing alloy, leaves the residue of the brazing alloy soft and ductile. As a result of this diffusion, the brazing alloy decreases from a hardness of about 675 VPN (Rockwell C 60) to a hardness of about 200 VPN (Rockwell B 90). For best joint properties, therefore, the joint clearance should be as small as possible.

During the brazing operation, as soon as a portion of the brazing alloy becomes molten, the boron therein starts to diffuse or alloy with the base metal and the base metal diffuses into the brazing alloy thereby raising the melting temperature of the residue of the brazing alloy in the joint. This alloying action continues until the melting temperature of the remaining brazing alloy has been raised above the furnace temperature whereupon said alloy begins to freeze. It is essential therefore that the temperature of the parts to be brazed and brazing alloy be raised quickly from just below the melting temperature of the brazing alloy to the minimum brazing temperature. For a Ni-Cr-B brazing alloy having a solidus temperature of about 1850° F. and a liquidus temperature of about 1950° F., a minimum brazing temperature of about 2000° F. is required. This quick melting of the brazing alloy permits capillary flow of the molten brazing alloy through the entire joint. If the furnace temperature is raised too slowly, a portion of the brazing alloy will become molten a substantial time before the balance whereupon said portion will alloy with the base metal and start to freeze thereby blocking the joint to further flow of the balance of said alloy into the joint. It has been found that said Ni-Cr-B brazing alloy should be heated from its solidus temperature to the minimum brazing temperature in a time no greater than 10 minutes. If a minimum brazing temperature of 2000° F. is required by the brazing alloy a higher furnace temperature of about 2150° F. would generally be necessary to provide for this rapid increase in temperature of the brazing alloy. The furnace is held at said 2150° F. for any desired length of time, a period of 15 minutes generally being sufficient. The brazed parts are then cooled as desired. Obviously if a Ni-Cr-B brazing alloy having higher solidus and liquidus temperatures is used, then correspondingly higher furnace brazing temperaures are necessary.

Because of the short time in which the furnace is raised to the brazing temperature, it is essential that the brazing alloy when molten should quickly flow and fill the joint. It is known that roughening of the joint surfaces of the parts to be brazed together increases the capillary flow of the brazing alloy. If, however, said surfaces are roughened by blasting with cast iron grit, preferably with No. 120 grit, and a film of said cast iron grit is left over each of said surfaces, it has been found that then the capillary flow of the brazing alloy is increased substantially more than would be expected from the roughening effect alone of said grit blasting. This unexpectedly large increase in the rate of capillary flow of the brazing alloy is believed to result from the fact that numerous small particles of cast iron grit are left on the surfaces to be brazed and that said particles are wet by the brazing alloy to increase the capillary attraction between the brazing alloy and the base metal. Other grit blasting material, such as steel grit, which can be wet by the brazing alloy could be used in lieu of the cast iron grit. Such steel or cast iron grit is hereinafter termed iron grit. Alumina and zirconia are examples of grit blasting materials which would not be wet by the brazing alloy. This preparation of the surfaces of the joint by grit blasting with iron grit results in a stronger and more uniform joint.

The use of a reducing atmosphere, such as hydrogen, for brazing is common, such an atmosphere eliminating the necessity for a brazing flux. Ordinary commercial hydrogen atmospheres are oxidizing to high chromium stainless alloys. Accordingly, the brazing process of the present invention is carried out in a dry hydrogen atmosphere preferably having a dew point of no more than −60° F. Except for maintaining a low dew point, dry hydrogen brazing is essentially the same as commercial hydrogen brazing. A furnace with a sealed retort is required with dry hydrogen brazing. Fig. 1 schematically illustrates a brazing furnace 10 having a sealed brazing chamber or retort 12 which is adapted to be heated by electrical means (not shown). In addition, dry hydrogen having a dew point of about −80° to −100° F. is supplied to the furnace brazing chamber through a passage 14, said hydrogen escaping through a conventional sand seal 16 for the retort 12 and then through a passage 18. With this arrangement a hydrogen atmosphere having a dew point of no more than −60° F. can be maintained in the brazing chamber. It is recognized however that applicant is not the first to use such a dry hydrogen atmosphere for brazing.

Figs. 2–4 illustrate typical examples of parts to be brazed together in accordance with the invention. Figs. 2–3 schematically illustrate a turbine rotor 20 and rotor blades 22 to be brazed together, only one blade 22 being illustrated. The turbine rotor is provided with a plurality of circumferentially spaced slots 24 extending diagonally across its periphery in each of which a turbine rotor blade 22 is to be secured. Each turbine rotor blade 22 has a root end portion shaped to fit its slot 24 with a minimum of clearance. The root end of each blade 22 and its slot 24 is first grit blasted with iron grit. Then the blades 22 are assembled on the rotor with a minimum of clearance between their root ends and the rotor grooves 24. A suitable fixture (not shown) is provided for holding the blades 22 in assembled position on the rotor 20. The mixture of powdered Ni-Cr-B alloy and a binder is then placed on one side of the turbine rotor along the junction of each blade root end with the turbine rotor as indicated at 26. The turbine rotor with its blades held in position is then placed in the brazing furnace, preferably in a horizontal position, with the brazing alloy 26 on its upper side. When the brazing alloy is molten it is drawn by capillary attraction through the joint between the rotor 20 and each blade 22. Inspection of the under side of the rotor readily reveals whether or not the brazing alloy was drawn completely through each joint. If desired a paste-like mixture of brazing alloy and binder, as previously described, may be disposed along the underside of the junction between the rotor and the rotor blade. Such a paste-like brazing alloy mixture readily adheres to a surface even at brazing temperatures so that it is not necessary that the brazing alloy be supported on a horizontal surface.

Fig. 3 illustrates an annular stem-like portion 20 which is to be brazed to a cap 32, said cap 32 having a counterbored portion 34 within which said stem is received. The parts 30 and 32 may comprise the head and stem, respectively, of a hollow poppet-type valve. In order to provide a minimum clearance between the stem 30 and cap 32, the diameter of said counterbored portion 34 may be slightly smaller than the diameter of the stem portion to be inserted therein whereby an interference fit is provided between said parts. Before the parts 30 and 32 are fitted together, their surfaces to be brazed are grit blasted with iron grit. The mixture of brazing powder and binder may be placed along the outer or upper junction of said parts as indicated at 36 and/or, if said mixture has a paste-like consistency, along the inner junction of said parts as indicated at 38. If the brazing mixture is only disposed at 36, then the brazing alloy will be drawn by capillary action down into the joint and if said alloy completely fills the joint this fact will be indicated by appearance of said alloy along the inner edge of said joint. Similarly if the brazing alloy is only disposed at 38, then the brazing alloy will be drawn by capillary action up into the joint and the appearance of said alloy all along the upper edge of said joint will indicate that the alloy has completely filled the joint.

Obviously the invention is not limited to brazing parts having the configurations illustrated in Figs. 2–4. Furthermore the invention is not limited to brazing parts of any particularly corrosive resistant high temperature alloy. For example, corrosion resistant high temperature alloys, having a composition defined by Aeronautical Materials Specification (AMS) Nos. 5770, 5646, and 5768 (published by the Society of Automotive Engineers) have been brazed by the method of the present invention. AMS 5770 and 5768 alloys are oxidation and corrosion resistant and have useful strength up to at least 2000° F. while in the case of the AMS 5646 alloy this is true only up to about 1500° F. Joints brazed in accordance with the invention of parts made from these alloys were found to have physical properties substantially equal to those of the base metal at said upper temperatures. Within the usual commercial limits, said base metal alloys have the following compositions:

AMS 5770

| | |
|---|---|
| Carbon | 0.38–0.48%. |
| Manganese | 2.00% maximum. |
| Silicon | 1.00% maximum. |
| Phosphorus | 0.04% maximum. |
| Sulfur | 0.03% maximum. |
| Chromium | 19.0–22.0%. |
| Nickel | 18.5–21.5%. |
| Cobalt | 18.5–21.5%. |
| Molybdenum | 3.5–4.5%. |
| Tungsten | 3.5–4.5%. |
| Columbium plus tantalum | 3.5–4.5%. |
| Copper | 0.5% maximum. |
| Iron | Remainder. |

AMS 5646

| | |
|---|---|
| Carbon | 0.08% maxium. |
| Manganese | 2.00% maximum. |
| Silicon | 0.50–1.0%. |
| Phosphorus | 0.04% maximum. |
| Sulfur | 0.03%. |
| Chromium | 17.0–19.0%. |
| Nickel | 9.0–12.0%. |
| Columbium plus tantalum | 10 times carbon–1.10%. |
| Molybdenum | 0.5% maximum. |
| Copper | 0.5% maximum. |
| Iron | Remainder. |

AMS 5768

| | |
|---|---|
| Carbon | 0.08–0.10%. |
| Manganese | 1.00–2.00%. |
| Silicon | 1.0% maximum. |
| Phosphorus | 0.04% maximum. |
| Sulfur | 0.03% maximum. |
| Chromium | 20.0–22.5%. |
| Nickel | 19.0–21.0%. |
| Cobalt | 18.5–21.0%. |
| Molybdenum | 2.50–3.50%. |
| Tungsten | 2.00–3.00%. |
| Columbium plus tantalum | 0.75–1.25%. |
| Nitrogen | 0.10–0.20%. |
| Iron | Remainder. |

The invention is equally applicable to brazing parts of other corrosion resistant high temperature alloys. It should be noted, however, that it is difficult to braze parts made of alloys containing titanium in a hydrogen atmosphere. In general, therefore, the brazing method of the present invention in a hydrogen atmosphere is not suitable for brazing parts of corrosion resistant high temperature alloys containing titanium.

The nickel in any of the Ni-Cr-Bo brazing alloys discussed can be replaced in whole or in part by cobalt (Co). This is to be expected since nickel and cobalt have similar chemical properties. With a Co-Cr-B or a Ni-Co-Cr-B brazing alloy the brazing process is the same as that described in connection with a Ni-Cr-B brazing alloy. Nickel is much more plentiful and cheaper than cobalt so that Ni-Cr-B brazing alloys are preferred.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. The method of brazing a pair of corrosion and oxidation resistant high temperature alloy parts together; said method comprising the steps of disposing the surfaces of said parts to be brazed together in abutting relation; placing a mixture containing a brazing alloy in powdered form on said parts along one or more edges of said abutting surfaces, said mixture including a binder for said brazing alloy and said brazing alloy consisting essentially of 8–20% chromium, 2–5% boron and 65–85% of metal from the group consisting of nickel and cobalt; then heating said parts to a temperature of at least 2000° F. for melting said brazing alloy to braze said parts together; and maintaining said parts in a dry reducing atmosphere of hydrogen during the brazing operation.

2. The method of brazing a pair of corrosion and heat resistant high temperature alloy parts together; said method comprising the steps of grit blasting the surfaces of said parts to be brazed together with a grit material in the solid state capable of being wet by the brazing alloy, said grit blasting roughening said surfaces and providing a film of said material over said surfaces; disposing said surfaces in abutting relation; placing a mixture, containing a brazing alloy in powdered form, on said parts along one or more edges of said abutting surfaces, said mixture including a binder for said brazing alloy and said brazing alloy consisting essentially of 8–20% chromium, 2–5% boron and 65–85% of metal from the group consisting of nickel and cobalt; then heating said parts and brazing alloy to a temperature of at least 2000° F. for melting said brazing alloy to braze said parts together, and maintaining said parts in a dry reducing atmosphere of hydrogen during the brazing operation.

3. The method of brazing a pair of corrosion and heat resistant high temperature alloy parts together; said method comprising the steps of grit blasting the surfaces of said parts to be brazed together with a grit material capable of being wet by the brazing alloy, said grit blasting roughening said surfaces and providing a film of said material over said surfaces; disposing said surfaces in abutting relation; placing a mixture, containing a brazing alloy in powdered form, on said parts along one or more edges of said abutting surfaces, said mixture including a binder for said brazing alloy and said brazing alloy consisting of 13–20% chromium, 2.75–4.75% boron, 3–5% iron, 0.05–0.5% carbon, 3.5–5.5% silicon and 65–75% of metal from the group consisting of nickel and cobalt; then heating said parts and brazing alloy to a temperature of at least 2000° F. for melting said brazing alloy to braze said parts together; and maintaining said parts in a dry reducing atmosphere of hydrogen during the brazing operation.

4. The method of brazing a pair of corrosion and heat resistant high temperature alloy parts together; said method comprising the steps of grit blasting the surfaces of said parts to be brazed together with iron grit in the solid state to roughen said surfaces and to provide a film of iron grit over said surfaces; disposing said surfaces in abutting relation; placing a mixture, containing a brazing alloy in powdered form, on said parts along one or more edges of said abutting surfaces; said mixture including a binder for said brazing alloy and said brazing alloy consisting essentially of 8–20% chromium, 2–5% boron, and 65–85% of metal from the group consisting of nickel and cobalt; then heating said parts from a temperature under the melting temperature of said brazing alloy to a temperature above the freezing temperature of said alloy in a time of not more than 10 minutes for quickly melting said brazing alloy to braze said parts together; and maintaining said parts in a dry reducing atmosphere of hydrogen during the brazing operation.

5. The method of brazing a pair of corrosion and heat resistant high temperature alloy parts together; said method comprising the steps of grit blasting the surfaces of said parts to be brazed together with iron grit in the solid state to roughen said surfaces and to provide a film of iron grit over said surfaces; disposing said surfaces in abutting relation; placing a mixture, containing a brazing alloy in powdered form, on said parts along one or more edges of said abutting surfaces; said mixture including a binder for said brazing alloy and said brazing alloy consisting of 13–20% chromium, 2.75–4.75% boron, 3–5% iron, 0.05–0.5% carbon, 3.5–5.5% silicon and 65–75% of metal from the group consisting of nickel and cobalt; then heating said parts from a temperature under the melting temperature of said brazing allow to a temperature above the freezing temperature of said alloy in a time of not more than 10 minutes for quickly melting said brazing alloy to braze said parts together; and maintaining said parts in a dry reducing atmosphere of hydrogen during the brazing operation.

6. The method of brazing a pair of corrosion and oxidation resistant high temperature alloy parts together; said method comprising the steps of grit blasting the surfaces of said parts to be brazed together with iron grit in the solid state to roughen said surfaces and to provide a film of said iron grit over said surfaces; disposing said surfaces in abutting relation; placing a mixture containing a brazing alloy in powdered form on said parts along one or more edges of said abutting surfaces, said mixture including a binder for said brazing alloy and said brazing alloy consisting of 65–75% nickel, 13–20% chromium, 2.75–4.75% boron, 3–5% iron, 0.05–0.5% carbon, 3.5–5.5% silicon; heating said parts from a temperature under the melting temperature of said brazing alloy to a temperature of at least 2000° F. in a time of not more than 10 minutes for quickly melting said brazing alloy to braze said parts together; and maintaining said parts in a dry reducing atmosphere of hydrogen having a dew point of no more than —60° F. during the brazing operation.

7. A pair of corrosion and oxidation resistant high temperature alloy parts containing nickel and chromium and a brazed joint connecting said parts in which said joint is made by the method recited in claim 6.

8. The method of brazing a pair of corrosion and oxidation resistant high temperature alloy parts together; said method comprising the steps of disposing the surfaces of said parts to be brazed together in substantially abutting relation with a brazing alloy disposed adjacent to said abutting surfaces, said brazing alloy consisting essentially of 8–20% chromium, 2–5% boron and 65–85% of metal from the groups consisting of nickel and cobalt; then heating said parts and brazing alloy to a temperature of at least 2000° F for melting said brazing alloy to braze said parts together; and maintaining said parts in a reducing atmosphere during the brazing operation.

9. A pair of corrosion and oxidation resistant high temperature alloy parts and a brazed joint connecting said parts in which said joint is made by the method recited in claim 8.

10. The method of brazing a pair of corrosion and oxidation resistant high temperature alloy parts together; said method comprising the steps of disposing the surfaces of said parts to be brazed together in substantially abutting relation with a brazing alloy disposed adjacent to said abutting surfaces, said brazing alloy consisting of 13–20% chromium, 2.75–4.75% boron, 3–5% iron, 0.05–0.5% carbon, 3.5–5.5% silicon and 65–75% of metal from the group consisting of nickel and cobalt; then heating said parts and brazing alloy to a temperature of at least 2000° F for melting said alloy to braze said parts together; and maintaining said parts in a reducing atmosphere during the brazing operation.

11. A pair of corrosion and oxidation resistant high temperature alloy parts containing nickel and chromium and a brazed joint connecting said parts in which said joint is made by the method recited in claim 10.

12. The method of brazing a pair of corrosion and oxidation resistant high temperature alloy parts together; said method comprising the steps of grit blasting the surfaces of said parts to be brazed together with a grit material in the solid state capable of being wet by the brazing alloy, said grit blasting roughening said surfaces and providing a film of said material over said surfaces; disposing said surfaces in substantially abutting relation with a brazing alloy disposed adjacent to said surfaces, said brazing alloy consisting essentially of 8–20% chromium, 2–5% boron and 65–85% of metal from the group consisting of nickel and cobalt; then heating said parts and brazing alloy to a temperature of at least 2000° F. for melting said brazing alloy to braze said parts together; and maintaining said parts in a reducing atmosphere during the brazing operation.

13. The method of brazing a pair of corrosion and oxidation resistant high temperature alloy parts together; said method comprising the steps of grit blasting the surfaces of said parts to be brazed together with iron grit in the solid state to roughen said surfaces and to provide a film of iron grit over said surfaces; disposing said surfaces in substantially abutting relation with a brazing alloy disposed adjacent to said surfaces, said brazing alloy consisting essentially of 8–20% chromium, 2–5% boron and 65–85% of metal from the group consisting of nickel and cobalt; then heating said parts and brazing alloy to a temperature of at least 2000° F. for melting said brazing alloy to braze said parts together; and maintaining said parts in a reducing atmosphere during the brazing operation.

14. The method of brazing a pair of corrosion and oxidation resistant high temperature alloy parts together; said method comprising the steps of grit blasting the surfaces of said parts to be brazed together with iron grit in the solid state to roughen said surfaces and to provide a film of iron grit over said surfaces; disposing said surfaces in substantially abutting relation with a brazing alloy disposed adjacent to said surfaces; said brazing alloy consisting of 13–20% chromium, 2.75–4.75% boron, 3–5% iron, 0.05 to 0.5% carbon, 3.5 to 5.5% silicon and 65–75% of metal from the group consisting of nickel and cobalt; and then heating said parts and brazing alloy to a temperature of at least 2000° F. for melting said brazing alloy to braze said parts together; and maintaining said parts in a reducing atmosphere during the brazing operation.

References Cited in the file of this patent

UNITED STATES PATENTS

| Number | Name | Date |
|---|---|---|
| 1,131,189 | Weintraub | Mar. 9, 1915 |
| 1,804,237 | Steenstrup | May 5, 1931 |
| 2,126,074 | Wissler | Aug. 9, 1938 |
| 2,133,291 | Gordon | Oct. 18, 1938 |
| 2,159,806 | Lenz et al. | May 23, 1939 |
| 2,165,793 | Grossman | July 11, 1939 |
| 2,276,847 | Kelley | Mar. 17, 1942 |
| 2,289,640 | Fetz | July 14, 1942 |
| 2,297,687 | Burgess et al. | Oct. 6, 1942 |
| 2,356,588 | Hermann | Aug. 22, 1944 |
| 2,373,116 | Hobrock | Apr. 10, 1945 |
| 2,466,890 | Gilbertson | Apr. 12, 1949 |

FOREIGN PATENTS

| Number | Country | Date |
|---|---|---|
| 487,263 | Great Britain | June 17, 1938 |

OTHER REFERENCES

Welding Encyclopedia, 1947, page 321, published by The Welding Engineer Publishing Company, 330 W. 42nd Street, New York, N. Y.